US008427088B2

(12) United States Patent
Imura et al.

(10) Patent No.: US 8,427,088 B2
(45) Date of Patent: Apr. 23, 2013

(54) APPARATUS FOR CARRYING OUT IMPROVED CONTROL OF ROTARY MACHINE

(75) Inventors: Akihiro Imura, Chita-gun (JP); Masami Fujitsuna, Kariya (JP); Hideji Yoshida, Hashima (JP); Muneaki Ishida, Tsu (JP); Tadanao Zanma, Tsu (JP)

(73) Assignees: Denso Corporation, Kariya (JP); Mie University, Tsu (JP)

( * ) Notice: Subject to any disclaimer, the term of this patent is extended or adjusted under 35 U.S.C. 154(b) by 379 days.

(21) Appl. No.: 12/832,276

(22) Filed: Jul. 8, 2010

(65) Prior Publication Data
US 2011/0006711 A1    Jan. 13, 2011

(30) Foreign Application Priority Data
Jul. 8, 2009   (JP) ................................ 2009-161481

(51) Int. Cl.
*H02P 6/16*   (2006.01)
(52) U.S. Cl.
USPC ................... 318/400.07; 318/400.3; 318/432
(58) Field of Classification Search .................. 318/139, 318/432, 400.07, 400.3; 123/399; 180/65.29; 700/29, 44; 701/22
See application file for complete search history.

(56) References Cited

U.S. PATENT DOCUMENTS

| 6,293,249 | B1 * | 9/2001 | Kuretake ........................ 123/399 |
|---|---|---|---|
| 6,561,162 | B2 * | 5/2003 | Kuretake ........................ 123/399 |
| 6,668,214 | B2 * | 12/2003 | Yasui et al. .................... 700/282 |
| 7,199,540 | B2 * | 4/2007 | Yaguchi ......................... 318/432 |
| 7,355,826 | B2 * | 4/2008 | Ochiai et al. ..................... 361/23 |
| 7,702,432 | B2 * | 4/2010 | Bandai et al. .................... 701/22 |
| 8,180,464 | B2 * | 5/2012 | Gao et al. ......................... 700/44 |
| 8,204,641 | B2 * | 6/2012 | Kawakami et al. ............. 701/22 |
| 2001/0039940 | A1 * | 11/2001 | Kuretake ....................... 123/399 |
| 2006/0007615 | A1 * | 1/2006 | Ochiai et al. ..................... 361/71 |
| 2006/0076914 | A1 * | 4/2006 | Yaguchi ......................... 318/432 |
| 2006/0125435 | A1 | 6/2006 | Geyer et al. |
| 2008/0255716 | A1 * | 10/2008 | Bandai et al. .................... 701/22 |

(Continued)

FOREIGN PATENT DOCUMENTS

| JP | A-2006-174697 | 6/2006 |
|---|---|---|
| JP | A-2008-228419 | 9/2008 |

OTHER PUBLICATIONS

H. Kobayashi et al., "Current Control System using Model Predictive Control with Integral Procedure," 2007 Tokai-Section Joint Conference of the Eighth Institutes of Electrical and Related Engineers, Shinshu University, Sep. 27-28, 2007 (with translation).

*Primary Examiner* — Paul Ip
(74) *Attorney, Agent, or Firm* — Oliff & Berridge, PLC

(57) ABSTRACT

In an apparatus, a predicting unit uses, as an initial value of a controlled variable, at least one of a first measured value of the controlled variable and a second measured value of a physical variable expressed as a function of the controlled variable. The predicting unit predicts, based on the initial value of the controlled variable, a value of the controlled variable when a driving mode of a switching element of a power converter is set. A driving unit has an integral element and determines, based on an output of the integral element to which a deviation between the predicted value of the controlled variable and a command value of the controlled variable is inputted, an actual driving mode of the switching element to thereby drive the switching element in the determined driving mode.

7 Claims, 6 Drawing Sheets

U.S. PATENT DOCUMENTS

| | | | |
|---|---|---|---|
| 2009/0005886 A1* | 1/2009 | Gao et al. | 700/29 |
| 2009/0297179 A1* | 12/2009 | Mestha et al. | 399/30 |
| 2010/0000809 A1* | 1/2010 | Nishi et al. | 180/65.29 |
| 2010/0058785 A1* | 3/2010 | Matsuno et al. | 62/125 |
| 2011/0006711 A1* | 1/2011 | Imura et al. | 318/400.07 |
| 2011/0031907 A1* | 2/2011 | Takahashi | 318/139 |
| 2011/0031910 A1* | 2/2011 | Takahashi | 318/400.3 |

* cited by examiner

| VOLTAGE VECTOR | SWITCHING ELEMENT IN ON STATE | | |
|---|---|---|---|
| | U-PHASE | V-PHASE | W-PHASE |
| V0 | L | L | L |
| V1 | H | L | L |
| V2 | H | H | L |
| V3 | L | H | L |
| V4 | L | H | H |
| V5 | L | L | H |
| V6 | H | L | H |
| V7 | H | H | H |

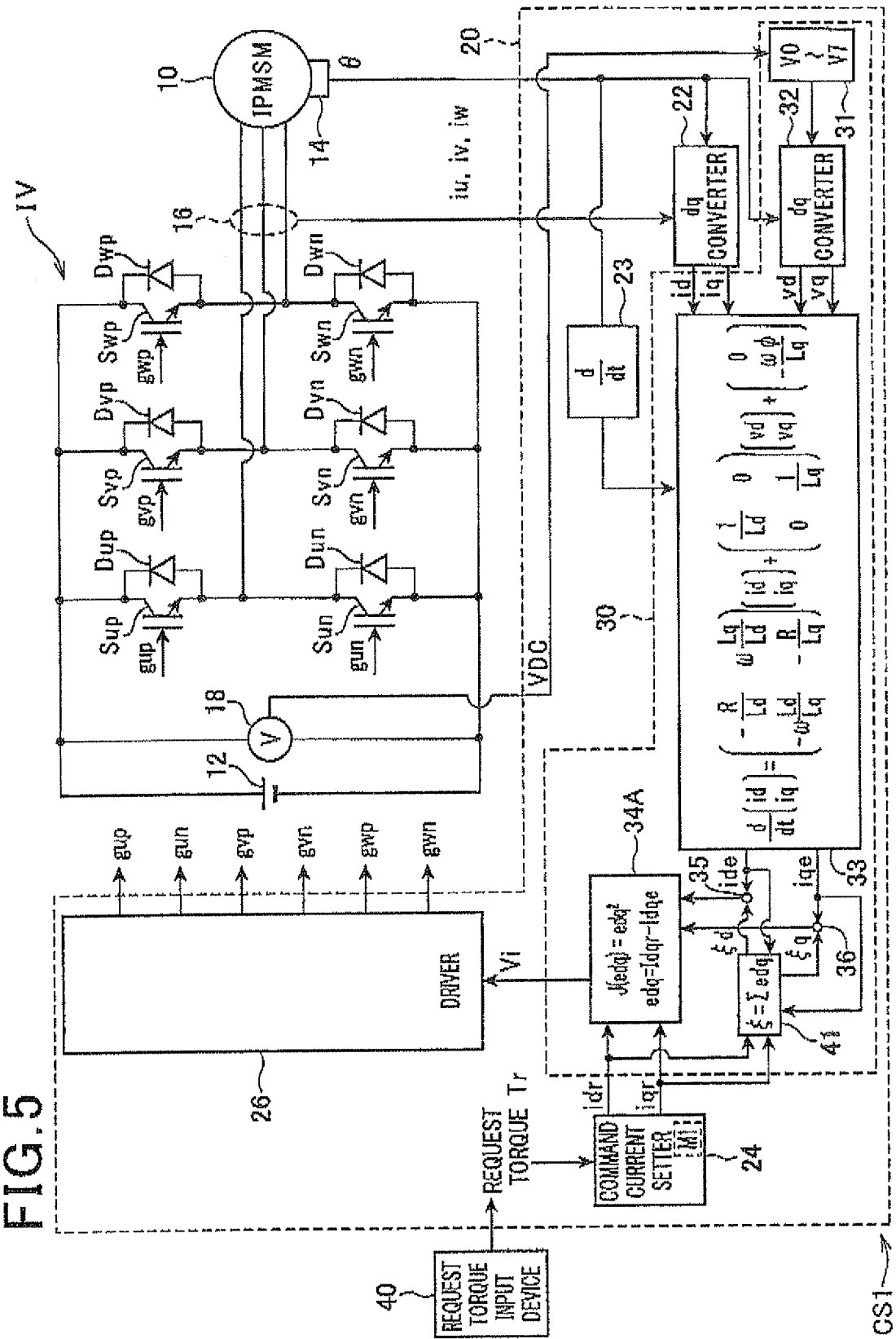

US 8,427,088 B2

APPARATUS FOR CARRYING OUT IMPROVED CONTROL OF ROTARY MACHINE

CROSS REFERENCE TO RELATED APPLICATIONS

This application is based on Japanese Patent Application 2009-161481 filed on Jul. 8, 2009. This application claims the benefit of priority from the Japanese Patent Application, so that the descriptions of which are all incorporated herein by reference.

FIELD OF THE INVENTION

The present invention relates to apparatuses for driving a switching element of a power converter so that the switching element selectively establishes electrical connection and electrical disconnection between a terminal of a rotary machine and a voltage application unit for applying a plurality of different voltage levels to the terminal of the rotary machine through the power converter. The drive of the power converter controls a controlled variable of the rotary machine.

BACKGROUND OF THE INVENTION

A type of such control apparatuses set forth above is designed to carry out current feedback control to thereby adjust an actual value of at least one controlled variable of a rotary machine to a command value. A typical control apparatus of this type carries out triangular-wave comparison PWM (Pulse Width Modulation) control for driving switching elements of an inverter as an example of power converters.

Specifically, the triangular-wave comparison PWM control is designed to calculate a substantially sinusoidal command voltage for each phase winding of a three-phase motor as an example of rotary machines; this command voltage is required to match an actual current flowing through each phase winding with a desired periodic command current.

The triangular-wave comparison PWM control is designed to compare the sinusoidal command voltage for each phase winding with a triangular carrier wave. Based on the result of the comparison, the triangular-wave comparison PWM control is designed to individually switch on and off each of a plurality of bridge-configured switching elements of an inverter based on the result of the comparison. This modulates an input voltage, such as a DC voltage, to the inverter into an AC (Alternating Current) voltage to be applied to each phase winding of the three-phase motor.

Specifically, adjustment of the on and off durations, that is, the duty (duty cycle) of each of the bridge-configured switching elements under the triangular-wave comparison PWM control matches the AC voltage to be applied to each phase winding with the command voltage therefor. This matches the actual current flowing through each phase winding to a desired periodic command current. The actual current flowing through each phase winding works to generate, as the at least one control variable, a torque corresponding to the desired command current for each phase winding.

When the command voltage is greater in amplitude the half of the inverter input DC voltage under the triangular-wave comparison PWM control so that the inverter is driven in an overmodulation mode, the output voltage of the inverter may include higher harmonic contents with large amplitudes. These higher harmonic contents may adversely affect on the following capability of the actual current flowing through each phase winding with respect to the corresponding command current. These adverse effects are due to the fact that the system of the triangular-wave comparison PWM control is designed assuming that any value of the output voltage of the inverter can be set as a value of the command voltage.

In order to address these adverse effects, Japanese Patent Application Publication No. 2008-228419 discloses a method of driving each of the bridge-configured switching elements under model predictive control. The method under the model predictive control is designed to predict a d-axis current value and a q-axis current value for each of a plurality of switching modes (drive modes) of a bridge-configured inverter for driving a three-phase motor.

The method is also designed to determine an optimum one of the plurality of switching modes. The optimum one of the plurality of switching modes allows the deviation of a d-axis command current value from the predicted d-axis current value and the deviation of a q-axis command current value from the predicted q-axis current value to be minimised; these d- and q-axis command current values are examples of a controlled variable of the three-phase motor. The method is further designed to drive the bridge-configured inverter according to the determined one of the plurality of switching modes.

Alternative examples of the method under the model predictive control are disclosed in Japanese Patent Application Publication No. 2006-174697 and in Hirokazu KOBAYASHI, Shinji DOKI, and Shigeru OKUMA, "Current Control System using Model Predictive Control with Integral Procedure", the 2007 Tokai-Section Joint Conference of the Eight Institutes of Electrical and Related Engineers.

SUMMARY OF THE INVENTION

The inventors have discovered that there is a point that should be improved in the method under the model predictive control disclosed in the Patent Publication No. 2008-228419.

Specifically, the inventors have found that there is steady-state deviation (steady-state error) between a current actually flowing through each of the three-phase windings and a corresponding command current during the inverter being driven in, for example, the overmodulation mode.

In view of the circumstances set force above, the present invention seeks to provide apparatuses for carrying out model predictive control of a rotary machine; these apparatuses are designed to address the point that should be improved in the method under the model predictive control disclosed in the Patent Publication No. 2008-228419.

Specifically, the present invention aims at providing apparatuses for carrying out model predictive control of a rotary machine; these apparatuses are designed to reduce steady-state deviation between a command value of a controlled variable of the rotary machine and a corresponding actual value of the controlled variable thereof.

According to one aspect of the present invention, there is provided an apparatus for driving a switching element of a power converter so that the switching member selectively establishes electrical connection and electrical disconnection between a terminal of a rotary machine and a voltage application unit for applying a plurality of different voltage levels to the terminal of the rotary machine through the power converter to thereby control a controlled variable of the rotary machine. The apparatus includes a predicting unit to use, as an initial value of the controlled variable, at least one of a first measured value of the controlled variable and a second measured value of a physical variable expressed as a function of the controlled variable and to predict, based on the initial value of the controlled variable, a value of the controlled variable when a driving mode of the switching element is set. The apparatus includes a driving unit having an integral element and configured to determine, based on an output of the integral element to which a deviation between the predicted value of the controlled variable and a command value of the controlled variable is inputted, an actual driving mode of the switching element to thereby drive the switching element in the determined driving mode.

BRIEF DESCRIPTION OF THE DRAWINGS

Other objects and aspects of the invention will become apparent from the following description of embodiments with reference to the accompanying drawings in which:

FIG. 5 is a circuit and block diagram of a control system according to the second embodiment of the present invention.

DETAILED DESCRIPTION OF EMBODIMENTS OF THE INVENTION

Embodiments of the present invention will be described hereinafter with reference to the accompanying drawings. In each of the embodiments, the present invention is, for example, applied to a control system for a three-phase motor-generator installed in a hybrid vehicle; this three-phase motor-generator is an example of various types of multiphase rotary machines.

First Embodiment

Figure 1:
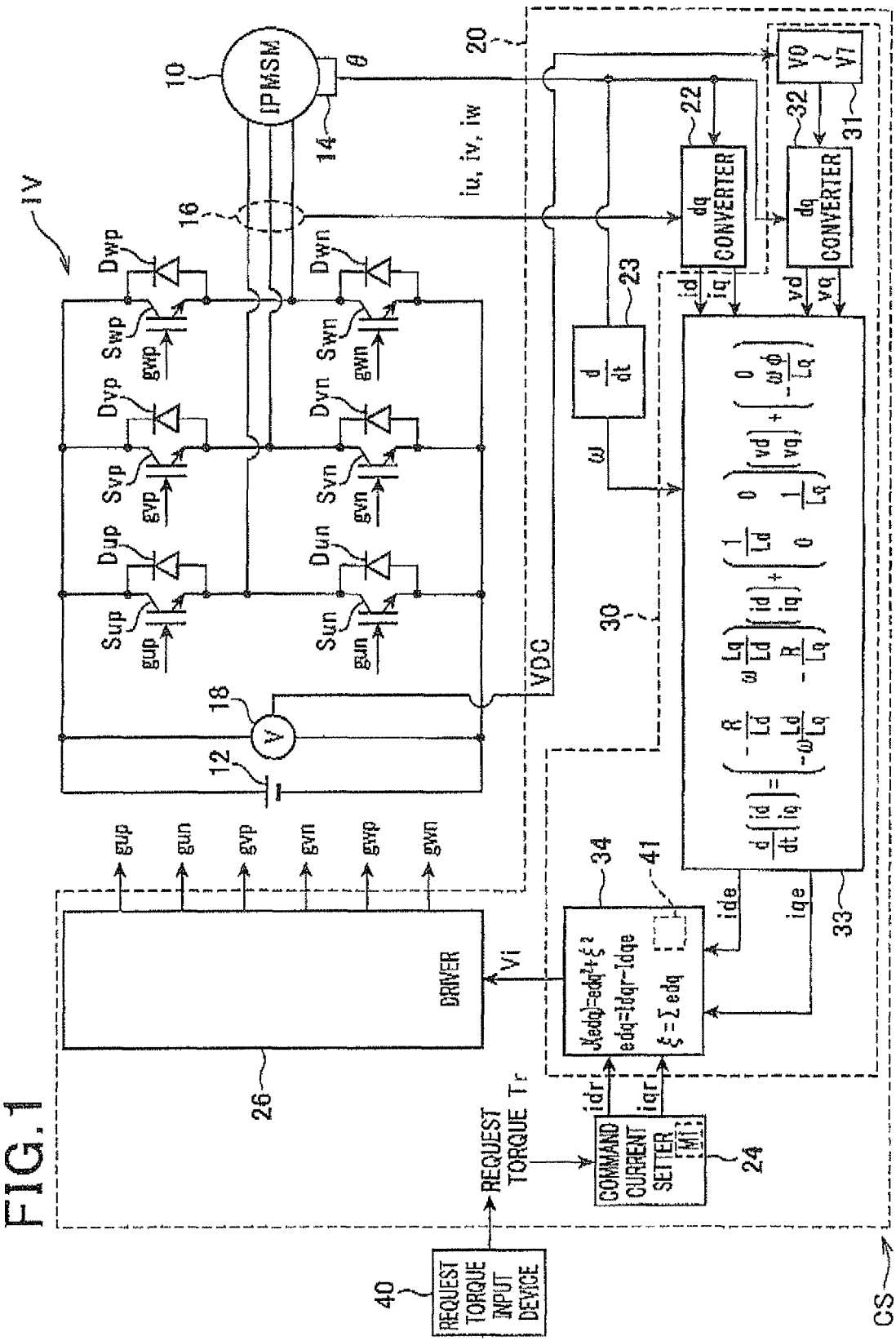
FIG. 1 is a circuit and block diagram of a control system comprised of a three-phase motor-generator, a three-phase inverter, and a controller according to the first embodiment of the present invention.

Referring to the drawings, particularly to FIG. 1, there is illustrated a three-phase motor-generator, referred to simply as "motor-generator (MG)" 10 installed in, for example, a hybrid vehicle. In the first embodiment, as the motor-generator 10, an IPMSM (Interior Permanent Magnet Synchronous Motor) having a salient-pole structure is used.

In FIG. 1, there is also illustrated an inverter IV serving as a power converter, a high-voltage battery 12, a rotational angle sensor 14, current sensors 16, a voltage sensor 18, an interface (not shown), and a controller 20. The inverter IV, the battery 12, the rotational angle sensor 14, the current sensors 16, the voltage sensor 18, the interface (not shown), and the controller 20 provide a control system CS for the motor-generator 10.

Specifically, the motor-generator 10 and the high-voltage battery 12 can establish electrical connection therebetween via the inverter IV.

For example, the motor-generator 10 is provided with an annular rotor having an iron rotor core. The iron rotor core Is, for example, directly or indirectly coupled to a crankshaft of an engine installed in the hybrid vehicle.

The rotor has a salient-pole structure.

Specifically, the rotor core of the rotor is provided at its circumferential portions with at lest one pair of permanent magnets. The permanent magnets of the at least one pair are so embedded in the outer periphery of the rotor core as to be symmetrically arranged with respect to the center axis of the rotor core at regular intervals in a circumferential direction of the rotor core.

One permanent magnet of the at least one pair has a north pole (N pole) directed radially outward away from the center of the rotor core. The other permanent magnet has a south pole (S pole) directed radially outward away from the center of the rotor core.

The rotor has a direct axis (d-axis) in line with a direction of magnetic flux created by the N pole, in other words, in line with a rotor N pole center line. The rotor also has a quadrature axis (q-axis) with a phase being $\pi/2$ radian electric angle leading with respect to a corresponding d-axis during rotation of the rotor. In other words, the q-axis is electromagnetically orthogonal to the d-axis.

The d and q axes constitute a d-q coordinate system (rotating coordinate system) defined in the rotor of the motor-generator 10.

An inductance Ld in the d-axis is lower than an inductance Lq in the q-axis because the permanent magnets have a magnetic permeability constant lower than that of the iron. Motors having a salient-pole structure means motors each having this inductance characteristic of the rotor.

Specifically, in an SPM (Surface Permanent Magnet) rotor or an IPM (Interior Permanent Magnet) rotor, d-axis is defined as the direction toward the center of the same polarity (N) pole thereof, and q-axis is defined as an axis electromagnetically orthogonal to the d-axis.

In a magnet-less motor, q-axis is defined as a minimal magnetic reluctance thereof, and d-axis is defined as an axis electromagnetically orthogonal to the q-axis.

The motor-generator 10 is also provided with a stator. The stator includes a stator core with, for example, an annular shape in its lateral cross section. The stator core is disposed around the outer periphery of the rotor core such that the inner periphery of the stator core is opposite to the outer periphery of the rotor core with a predetermined air gap.

For example, the stator core also has a plurality of slots. The slots are formed through the stator core and are circumferentially arranged at given intervals. The stator also includes a set of three-phase windings (armature windings) wound in the slots of the stator.

The three-phase (U-, V-, and W-phase) windings are wound in the slots such that the U-, V-, and W-phase windings are shifted by an electric angle of, for example, $2\pi/3$ radian in phase from each other.

One ends of the U-, V-, and W-phase windings are connected to each other in, for example, star configuration.

The motor-generator 10 is operative to receive at its three-phase windings three-phase currents to thereby generate a rotating magnetic flux; this allows the rotor to turn based on magnetic attractive force between the rotating magnetic flux and a magnetic flux of the rotor.

The inverter IV is designed as a three-phase inverter. The inverter IV is comprised of a first pair of series-connected high- and low-side switching elements Sup and Sun, a second pair of series-connected high- and low-side switching elements Svp and Svn, and a third pair of series-connected high- and low-side switching elements Swp and Swn, The inverter IV is also comprised of flywheel diodes Dup, Dun, Dvp, Dvn, Dwp, and Dwn electrically connected in antiparallel to the switching elements Sup, Sun, Svp, Svn, Swp, and Swn, respectively.

In the first embodiment, as the switching elements Sup, Sun, Svp, Svn, Swp, and Swn, IGBTs are respectively used.

When power MOSFETs are used as the switching elements Sup, Sun, Svp, Svn, Swp, and Swn, intrinsic diodes of the power MOSFETs can be used as the flywheel diodes, thus eliminating the flywheel diodes.

The cathode of each of the flywheel diodes Dup, Dun, Dvp, Dvn, Dwp, and Dwn is connected with the drain of a corresponding one of the switching elements Sup, Sun, Svp, Svn, Swp, and Swn, and the anode thereof is connected with the source of a corresponding one of the switching elements Sup, Sun, Svp, Svn, Swp, and Swn.

The first, second, and third pairs of switching elements Sup, Sun, Svp, Svn, Swp, and Swn are parallely connected with each other in bridge configuration.

Ends of the high-side switching elements (upper arms) Sup, Svp, and Swp are collected as a common connection terminal (DC input terminal), and the common connection terminal is connected with the positive electrode of the high-voltage battery 12. Ends of the low-side switching elements (lower arms) Sun, Svn, and Swn are collected as a common connection terminal (DC input terminal), and the common connection terminal is connected with the negative electrode of the high-voltage battery 12.

The angular sensor 14 is arranged, for example, close to the rotor of the motor-generator 10 and operative to measure an actual rotational angle (electric angle) θ of the d-axis of the rotor with respect to a stator coordinate system fixed in space which characterizes the three-phase windings of the stator. The angular sensor 14 is communicable with the controller 20 via the interface and operative to send, to the controller 20 via the interface, the measured actual rotation angle θ of the rotor.

The current sensors 16 are communicable with the controller 20 via the interface and operative to measure three-phase instantaneous current values iu, iv, and iw to flow through the respective V-, and W-phase windings of the motor-generator 10. The current sensors 16 are operative to output, to the controller 20 through the interface, the measured instantaneous values of the three-phase instantaneous current values iu, iv, and iw.

The voltage sensor 18 is communicable with the controller 20 via the interface and operative to output, to the controller 20, a signal indicative of an input voltage (battery voltage VDC) across the high-voltage battery 12.

The controller 20 is designed as, for example, a computer circuit consisting essentially of, for example, a CPU, an I/O interface, and a memory unit, and operates on a voltage lower than the battery voltage VDC. Thus, the controller 20 constitutes a low voltage system, and the motor-generator 10, the inverter IV, and the high-voltage battery 12 constitute a high voltage system.

The interface is provided with, for example, photo-couplers as examples of insulators. The interface is configured to establish electrical insulation between the low voltage system (the controller 20) and the high voltage system, and to allow communications therebetween.

The controller 20 is communicable with a request torque input device 40 installed in the hybrid vehicle. The request torque input device 40 is operative to input, to the controller 20, a commanded torque (request torque) of a user, such as an acceleration command of the user.

For example, an accelerator position sensor installed in the hybrid vehicle can be used as the request torque input device 40. Specifically, the accelerator position sensor is operative to sense an actual position of an accelerator pedal of the hybrid vehicle operable by the driver and to send, as data representing a request torque of the driver, the sensed actual position of the accelerator pedal to the controller 20. The data representing a variable request torque will be referred to as "request torque data" hereinafter.

According to the pieces of data sent from the sensors 14, 16, and 18, the controller 20 is operative to generate:

a drive signal gup for driving the switching element Sup;
a drive signal gun for driving the switching element Sun;
a drive signal gvp for driving the switching element Svp;
a drive signal gvn for driving the switching element Svn;
a drive signal gwp for driving the switching element Swp; and
a drive signal gwn for driving the switching element Swn.

Each of the drive signals gup, gun, gvp, gvn, gwp, and gwn is, for example, a pulse signal with a controllable duty cycle (controllable pulse width, or controllable on duration).

Specifically, the controller 20 is operative to drive the inverter IV by individually adjusting the duty cycle of each of the drive signals gup, gun, gvp, gvn, gwp, and gwn to thereby regulate a torque T to be generated in the motor-generator 10 to a commanded torque (request torque) Tr. In other words, the controller 20 is operative to individually adjust the duty cycle of each of the drive signals gup, gun, gvp, gvn, gwp, and gwn to thereby regulate drive current flowing into the motor-generator 10 to command current required for the motor-generator 10 to generate the request torque Tr.

That is, although the torque T to be generated in the motor-generator 10 is a target controlled variable of the motor-generator 10, the controller 20 actually controls, as a direct controlled variable, the drive current flowing into the motor-generator 10 to the command current required for the motor-generator 10 to generate the request torque Tr.

Particularly, the controller 20 according to the first embodiment carries out model predictive control so as to regulate a value the drive current flowing into the motor-generator 10 to a value of the command current. The model predictive control is designed to predict a value of the drive current flowing into the motor-generator 10 for each of a plurality of switching modes (drive modes) of the inverter IV, and select one of the plurality of switching modes. The selected one of the plurality of switching modes allows the predicted value of the drive current to be the closest to a corresponding value of the command current.

Referring to FIG. 1, the controller 20 includes functional modules equivalent to tasks to be executed by the controller 20 according to the first embodiment.

Specifically, the controller 20 includes a dq converter 22, a speed calculator 23, a command current setter 24, and a model predictive control unit 30. The model predictive control unit 30 includes a switching-mode setter 31, a dq converter 32, a predictor 33, and a switching mode determiner 34. Note that each of or some of the functional modules included in the controller 20 can be designed as a hardware circuit, a programmed logic circuit, or a hardware and programmed-logic hybrid circuit.

The dq converter 22 works to receive the three-phase instantaneous current values iu, iv, and iw measured by the current sensor 16 and the actual rotation angle θ measured by the angular sensor 14.

The dq converter 22 also works to convert the received three-phase instantaneous current values iu, iv, and iw in the stator coordinate system into actual d-axis and q-axis currents id and iq in the d-q coordinate system of the rotor based on the received actual rotational angle θ.

The speed calculator 23 works to receive the actual rotation angle θ measured by the angular sensor 14, and calculate, based on the actual rotation angle θ, an actual electric angular velocity (rotational velocity) ω of the d-axis of the rotor.

The command current setter 24 works to receive the request torque Tr inputted from the request torque input device 40. The command current setter 24 works to set a d-axis command current idr and a q-axis command current iqr in the d-q coordinate system of the rotor based on the received request torque Tr. The d-axis command current idr and the q-axis command current iqr correspond to request three-phase currents in the d-q coordinate system; these request currents are required to generate the request torque Tr.

For example, the command current setter 24 stores therein a map M1 comprised of, for example, a data table, an equation, or a program. The map M1 represents a function (relationship) between a variable of the request torque Tr and a variable of each of the command currents idr and iqr. Based on the map M1, the command current setter 24 sets the command currents idr and iqr corresponding to the input value of the request torque Tr.

These command currents idr and iqr, the actual currents id and iq, and the rotational velocity ω are passed to the model predictive control unit 30 as input parameters. Based on the input parameters, the model predictive control unit 30 works to determine, based on the inputted parameters, one of voltage vectors Vi that defines one of the plurality of switching modes in which the inverter IV is driven. The model predictive control unit 30 also works to input the determined one of the voltage vectors Vi to the driver 26. The driver 26 works to generate, based on the inputted voltage vector Vi, the drive signals gup, gun, gvp, gvn, gwp, and gwn each with an adjusted value of the duty cycle, and output, to the respective switching elements Sup, Sun, Svp, Svn, Swp, and Swn, the generated drive signals gup, gun, gvp, gvn, gwp, and gwn.

Figures 2A, 2B:
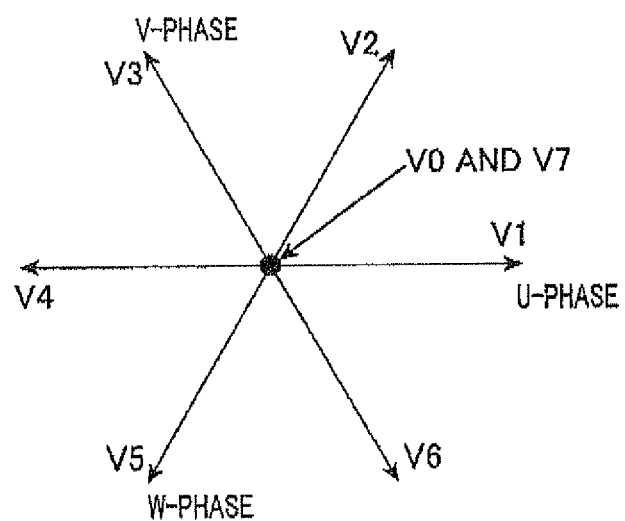
FIG. 2A is a table schematically illustrating the on or off state of high- and low-side switching elements of each phase in the three-phase inverter for each of voltage vectors that define switching modes of the three-phase inverter according to the first embodiment.
FIG. 2B is a view schematically illustrating the voltage vectors in a three-phase stationary coordinate space defined in a stator of the motor-generator according to the first embodiment.

The voltage vectors Vi defining on-off modes of the respective switching elements Sup, Sun, Svp, Svn, Swp, and Swn of the inverter IV are expressed by eight space voltage vectors V0 to V7 illustrated in FIGS. 2A and 2B.

In FIG. 2A, reference character "H" represents that the high-side switching element of a corresponding pair of the switching elements is ON, and reference character "L" represents that the low-side switching element of a corresponding pair of the switching elements is ON.

For example, the voltage vector V0 (L, L, L) expresses a switching mode in which all of the low-side switching elements Sun, Svn, and Swn are ON and all of the high-side switching elements Sup, Svp, and Swp are OFF. In addition, the voltage vector V7 (H, H, H) expresses a switching mode in which all of the high-side switching elements Sup, Svp, and Swp are ON and all of the low-side switching elements Sun, Svn, and Swn are OFF. The voltage vector V1 (H, L, L) expresses in a switching mode in which the high-side switching element Sup and the low-side switching elements Svn and Swn are ON, and the low-side switching element Sun and the high-side switching elements Svp and Swp are OFF.

The voltage vectors V0 and V7 express that all of the three-phase windings are short-circuited so that line-to-line voltages between the three-phase windings of the motor-generator 10 are all zero. Thus, the voltage vectors V0 and V7 will be referred to as "zero vectors" hereinafter.

In contrast, each of the remaining voltage vectors V1 to V6 express a switching mode in which at least one of the high-side switching elements and at least one of the low-side switching elements are ON. Thus, the voltage vectors V1 to V6 will be referred to as "non-zero vectors" hereinafter. Note that, as illustrated in FIG. 2B, each of the voltage vectors V1, V3, and V5 corresponds to a corresponding one of positive U-, V-, and W-phase axes in the three-phase stationary coordinate space defined in the stator of the motor-generator 10.

Next, functions of the model predictive control unit 30 will be described hereinafter.

The switching-mode setter 31 is operative to set the switching mode of the inverter IV. In the first embodiment, the switching-mode setter 31 selects one of the voltage vectors V0 to V7, and sets the selected voltage vector Vi (i=0, 1, 2, 3, 4, 5, 6, or 7) as the switching mode of the inverter IV.

Note that, because the substantial half of the input DC voltage (the battery voltage VDC) to the inverter IV is applied to each phase winding, the reference character "H" represents VDC/2 to be applied to a corresponding phase winding, and the reference character "L" represents −VDC/2 to be applied to a corresponding phase winding. That is, the components of the selected voltage vector Vi can be represented by VDC/2 and −VDC/2.

For example, the voltage vector V0 is represented as V0 (−VDC/2, −VDC/2, −VDC/2), and the voltage vector V1 is represented as V1 (VDC/2, −VDC/2, −VDC/2).

The dq converter 32 is operative to convert the selected voltage vector Vi into a voltage vector (vd, vq) in the d-q coordinate system of the rotor based on the received actual rotational angle θ.

The predictor 33 is operative to predict, based on the voltage vector (vd, vq), the actual d- and q-axis currents id and iq, and the actual electric angular velocity ω, a d-axis current value id and a q-axis current value iq that should flow into the motor-generator 10 when the inverter IV is driven in the selected voltage vector Vi. Specifically, the predictor 33 cyclically predicts the d-axis current value id and q-axis current value iq based on the voltage vector (vd, vq), the actual d-axis and q-axis currents id and iq, and the actual electric angular velocity ω.

Note that, in the motor-generator 10 in the d-q coordinate system, the following normal voltage equations [c1] and [c2] based on fundamental-wave drive without considering the stator iron loss are established:

$$vd = (R + pLd)id - \omega Lq iq \qquad [c1]$$

$$vq = \omega Ld id + (R + pLq)iq + \omega \phi \qquad [c2]$$

where R represents a resistance of each armature winding, p represents a differential operator, Ld represents the inductance in the d-axis, Lq represents the inductance in the q-axis, and φ represents a flux linkage constant to the armature windings.

Solving the equations [c1] and [c2] for the deviation terms of the actual d- and q-axis currents id and iq establishes the following equations [c3] and [c4]:

$$pid = -(R/Ld)id + \omega(Lq/Ld)iq + vd/Ld \qquad [c3]$$

$$piq = -\omega(Ld/Lq)id - (Rd/Lq)iq + vq/Lq - \omega\phi/Lq \qquad [c4]$$

The equations [c3] and [c4] can be expressed as the following equation:

$$\frac{d}{dt}\begin{pmatrix} id \\ iq \end{pmatrix} = \begin{pmatrix} -\frac{R}{Ld} & \omega\frac{Lq}{Ld} \\ -\omega\frac{Ld}{Lq} & -\frac{R}{Lq} \end{pmatrix}\begin{pmatrix} id \\ iq \end{pmatrix} + \begin{pmatrix} \frac{1}{Ld} & 0 \\ 0 & \frac{1}{Lq} \end{pmatrix}\begin{pmatrix} vd \\ vq \end{pmatrix} + \begin{pmatrix} 0 \\ -\frac{\omega\varphi}{Lq} \end{pmatrix}$$

At a present prediction cycle, the predictor 33 discretizes the equations [c3] and [c4] using, for example, a forward difference method, and predicts a value ide of the d-axis current id and a value iqe of the q-axis current iq at the next prediction cycle based on the discretized equations [c3] and [c4].

The predictor 33 carries out the prediction of a value of the d-axis current id and a value of the q-axis current iq for each of the voltage vectors V0 to V7. That is, a value ide of the d-axis current id and a value iqe of the q-axis current iq are predicted for each of the voltage vectors V0 to V7.

The switching mode determiner 34 is operative to determine one of the eight switching modes corresponding to the voltage vectors V0 to V7 based on the predicted current values ide and iqe of the d- and q-axis currents id and iq for each of the voltage vectors V0 to V7 and the d- and q-axis command currents idr and iqr.

In the first embodiment, the switching mode determiner 34 evaluates values of an evaluation function J of the respective eight switching modes, and selects one of the eight switching modes, the evaluation of which is the highest in all of the eight switching modes.

In the first embodiment, the evaluation function J has a characteristic that a value of the evaluation function J increases with decrease in evaluation. Specifically, a value of the evaluation function J of one switching mode is calculated based on the inner product of the deviation edq of a command current vector Idqr (idr, iqr) in the d-q coordinate system from a predicted current vector Idqe (ide, iqe) in the d-q coordinate system. The deviation edq of each of the d- and q-axis command currents (idr, iqr) of the command current vector Idqr from a corresponding one of the predicted d- and q-axis current values (ide, iqe) of the predicted current vector Idqe can take a positive or a negative value. For this reason, the evaluation function J expressed as the inner product $edq^2$ can have a characteristic that a value of the evaluation function J increases with decrease in evaluation.

However, if the evaluation function J is defined based on only the deviation edq of the command current vector Idqr (idr, iqr) from the predicted current vector Idqe (ide, iqe), the inventors have confirmed that there is steady-state deviation between each of the actual d-axis and q-axis currents id and iq and a corresponding one of the d- and q-axis command currents idr and iqr.

In order to address such a problem due to the appearance of the steady-state deviation, the switching mode determiner 34 includes an integral element 41 to which the deviation edq of the command current vector Idqr from the predicted current vector Idqe is inputted.

Specifically, the switching mode determiner 34 is operative to quantify the history of changes in the deviation edq of the command current vector Idqr from the predicted current vector Idqe according to the output ξ (ξd, ξq) of the integral element 41, and adds the quantified history of the changes in the deviation edq to the inner product $edq^2$, thus generating the evaluation function J. Note that reference character ξd represents a d-axis component of the output ξ, and reference character ξq represents a q-axis component of the output ξ.

The integral element 41 is operative to integrate (accumulate) a value of the deviation edq of the command current vector Idqr from the predicted current vector Idqe calculated for each of the previous prediction cycles and the present prediction cycle.

Note that the input to the integral element 41 includes the deviation edq between the command current vector Idqr and the predicted current vector Idqe without including the actual d-axis and q-axis currents id and iq. However, because the predicted d- and q-axis current values (ide, iqe) of the predicted current vector Idqe are calculated based on the actual d-axis and q-axis currents id and iq, the output ξ of the integral part reflects the actual d-axis and q-axis currents id and iq.

Specifically, the evaluation function J includes the output ξ of the integral part 41 that consists of the accumulation of the changes in the deviation edq of the command current vector Idqr from the predicted current vector Idqe during the previous prediction cycles and the present prediction cycle. For this reason, determination of one of the eight switching modes (eight voltage vectors) according to the evaluation function J allows the steady-state deviation between each of the actual d-axis and q-axis currents id and iq and a corresponding one of the d- and q-axis command currents idr and iqr to be reduced.

Note that the switching mode determiner 34 according to the first embodiment does not add directly the output ξ of the integral element 41 to the inner product $edq^2$, but adds the square of the output ξ of the integral element 41 to the inner product $edq^2$, thus generating the evaluation function J. This is because the evaluation function J has a characteristic that a value of the evaluation function J increases with decrease in evaluation, and the output ξ of the integral element 41 can take a positive or a negative value.

Figure 3:
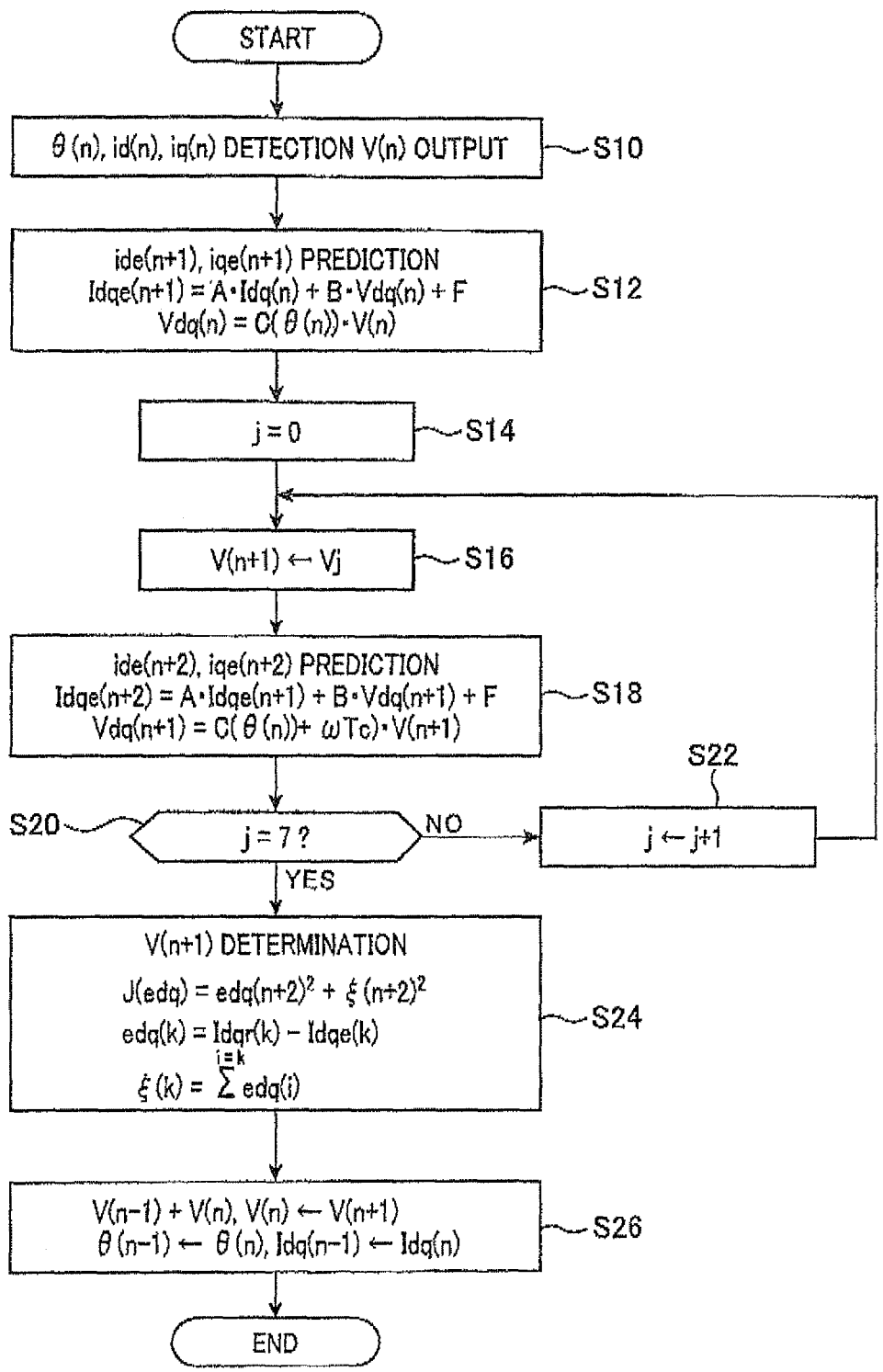
FIG. 3 is a flowchart schematically illustrating an example of a routine of model predictive control to be executed by the controller illustrated in FIG. 1.

Next, a routine of the model predictive control to be executed by the controller 20 will be described hereinafter with reference to FIG. 3; this routine is equivalent to the functional modules 22 to 24, 26, and 31 to 34. The routine is repeatedly executed by the controller 20 at the preset prediction cycle referred to as "Tc".

When the routine is launched at a present prediction cycle Tc (n), the controller 20 receives the actual rotational angle θ(n) from the angular sensor 14, and obtains the actual d-axis and q-axis currents id(n) and iq(n) in step S10. Note that reference character (n) represents that a parameter value X to which the reference character (n) is assigned as X(n) is obtained by the controller 20 at the present prediction cycle Tc (n). Thus, a parameter value X obtained at the previous prediction cycle Tc (n−1) is expressed as X(n−1).

In step S10, the controller 20 also outputs a voltage vector V(n) determined at the previous prediction cycle Tc (n−1) for the present prediction cycle Tc (n).

Next, in step S12, the controller 20 predicts, based on the voltage vector V(n), a d-axis current value ide(n+1) and a q-axis current value iqe(n+1) at the next prediction cycle Tc (n+1). In the first embodiment, as described above, the controller 20 discretizes an equation model of the motor-generator 10 in the d-q coordinate system expressed by the equations [c3] and [c4] by the prediction control cycle Tc in accordance with the forward difference method. Then, the controller 20 calculates the d-axis current value ide(n+1) and q-axis current value iqe(n+1) at the next prediction cycle Tc (n+1) based on the discretized equation model.

In step S12, the controller 20 uses the actual d-axis and q-axis currents id(n) and iq(n) obtained in step S10 as initial values of the d- and q-axis currents id and iq in the equations [c3] and [c4]. In addition, in step S12, the controller 20 converts, using the actual rotational angle θ(n), the voltage vector V(n) into a voltage vector Vdq(n) in the d-q coordinate system, and uses the d- and q-axis components of the voltage vector Vdq(n) as the d- and q-axis voltages vd and vq in the equations [c3] and [c4].

For example, assuming that $$\begin{pmatrix} -\frac{R}{Ld} & \omega\frac{Lq}{Ld} \\ -\omega\frac{Ld}{Lq} & -\frac{R}{Lq} \end{pmatrix}, \begin{pmatrix} \frac{1}{Ld} & 0 \\ 0 & \frac{1}{Lq} \end{pmatrix}, \text{ and } \begin{pmatrix} 0 \\ -\frac{\omega\varphi}{Lq} \end{pmatrix}$$

are respectively expressed as A, B, and F, the discretized equation model of the predicted current vector Idqe(n) can foe expressed by the following equation:

$$Idqe(n+1) = Ad \cdot Idq(n) + Bd \cdot Vdq(n) + Fd$$

where Ad is $e^{Atc}$, Bd is $$\int_0^{Tc} e^{A\tau} d\tau B,$$

Fd is $$\int_0^{Tc} e^{A\tau} d\tau F,$$

and idq(n) represents a vector of the actual d-axis and q-axis currents id(n) and iq(n).

The voltage vector Vdq(n) can be expressed by the following equation:

$$Vdq(n) = C(\theta(n)) \cdot V(n)$$

where C is a constant.

Next, the controller 20 carries out operations in steps S14 to S22 to thereby predict a d-axis current value ide(n+2) and a q-axis current value iqe(n+2) at the prediction cycle Tc (n+2) after the next prediction cycle Tc (n+1) for each of the eight voltage vectors.

Specifically, the controller 20 sets, to "0", a variable j that defines one of the eight voltage vectors in step S14. Next, the controller 20 sets the voltage vector Vj as the voltage vector V (n+1) at the next prediction cycle Tc (n+1) in step S16.

In step S18, the controller 20 calculates the d-axis current value ide(n+2) and q-axis current value iqe(n+2) at the prediction cycle Tc (n+2) based on the discretized equation model in the same manner as step S12. Note that, in step S18, the controller 20 uses the predicted d-axis and q-axis current values ide(n+1) and iqe(n+1) calculated in step S12 as initial values of the d- and q-axis currents id and iq in the equations [c3] and [c4]. In addition, in step S18, the controller 20 converts, using the sum of the actual rotational angle θ(n) and the product "ωTc" of the ω and the prediction cycle Tc, the voltage vector V(n+1) into a voltage vector Vdq(n+1) in the d-q coordinate system.

For example, the discretized equation model of the predicted current vector Idqe(n+2) can be expressed by the following equation:

$$Idqe(n+2) = Ad \cdot Idq(n+1) + Bd \cdot Vdq(n+1) + Fd$$

The voltage vector Vdq(n+1) can be expressed by the following equation:

$$Vdq(n+1) = C(\theta(n) + \omega Tc) \cdot V(n+1)$$

In step S20, the controller 20 determines whether the variable j is set to "7". This operation is to determine whether the current prediction in step S18 has been completed for all of the voltage vectors V0 to V7.

Upon determining that the variable j is not set to "7" (NO in step S20), the controller 20 increments the variable j by "1" in step S22, returns to step S16, and repeatedly carries out the operations in steps S16 to S22.

Otherwise, upon determining that the variable j is set to "7" (YES in step S20), the controller 20 proceeds to step S24.

In step S24, the controller 20 carries out an operation to determine one of the voltage vectors V0 to V7 as the voltage vector V(n+1) at the next prediction cycle Tc (n+1). Specifically, in step S24, the controller 20 determines, as the target voltage vector V(n+1) at the next prediction cycle Tc (n+1), one of the voltage vectors V0 to V7 that minimizes the evaluation function J in all of the voltage vectors V0 to V7.

Specifically, at the point of time of the affirmative determination in step S20, the predicted d- and q-axis current values ide (n+2) and iqe (n+2) for each of the voltage vectors V0 to V7 have been calculated.

Thus, in step S24, the controller 20 calculates the deviation edq(k=n+2) of the command current vector Idqr(k=n+2) from the predicted current vector Idqe(k=n+2), and calculates the inner product edq(k=−n+2)² of the deviation edq(k=n+2) of the command current vector Idqr(k=n+2) from the predicted current vector Idqe(k=n+2).

In step S24, the controller 20 calculates the output ξ(k=n+2) of the integral part as the accumulation of the changes in the deviation edq of the command current vector Idqr from the predicted current vector Idqe during the previous prediction cycles and the present prediction cycle. Note that, for each of the previous prediction cycles, the predicted current vector Idqe is calculated based on the actually selected voltage vector in step S12. For this reason, the accumulation of the deviation edq of the command current vector Idqr from the predicted current vector Idqe during the previous prediction cycles is common in the voltage vectors V0 to V7 at the next prediction cycle Tc (n+1).

Thus, in step S24, the controller 20 adds the deviation edq(k=n+2) of the command current vector Idqr(k=n+2) from the predicted current vector Idqe(k=n+2) for each of the voltage vectors V0 to V7 to the output ξ (k=n+1); this output ξ (k=n+1) constitutes the evaluation function J determined at the prior prediction cycle Tc (n−1).

Thereafter, in step S24, the controller 20 calculates the sum of the inner product edq(k=n+2)² for each of the voltage vectors V0 to V7 and the output ξ(k=n+2) of the integral part for a corresponding one of the voltage vectors V0 to V7 to thereby calculate eight values of the evaluation function J for the respective voltage vectors V0 to V7.

Thus, in step S24, the controller 24 selects one of the voltage vectors V0 to V7, a value of the evaluation function J of which is minimized in all of the voltage vectors V0 to V7. In step S24, the controller 20 generates, based on the selected one of the voltage vectors V0 to V7, the drive signals gup, gun, gvp, gvn, gwp, and gwn each with an adjusted value of the duty cycle. The controller 20 also outputs, to the respective switching elements Sup, Sun, Svp, Svn, Swp, and Swn, the generated drive signals gup, gun, gvp, gvn, gwp, and gwn.

This makes it possible to reduce the steady-state deviation between each of the actual d- and q-axis currents id and iq and a corresponding one of the d- and q-axis command currents idr and iqr.

Thereafter, in step S26, the controller 20 sets the voltage vectors V(n+1) and V(n) to the voltage vectors V(n) and V(n−1), the rotational angle θ(n) to the rotational angle θ(n−

1), and the actual d- and q-axis currents id(n) and iq(n) to the actual d- and q-axis currents id(n−1) and iq(n−1). After the completion of the operation in step S26, the controller 20 exits the routine.

Figure 4A:
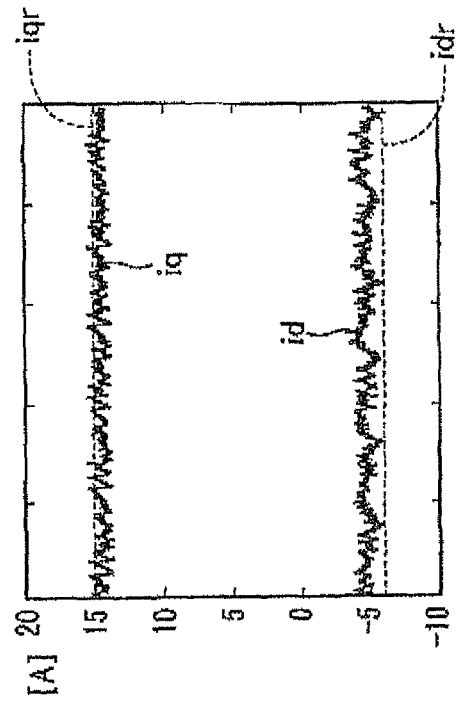
FIG. 4A is a graph schematically illustrating an example of simulation results of the waveforms of actual d- and q-axis currents and those of d- and q-axis command currents in the control system according to the first embodiment.

FIG. 4A schematically illustrates an example of the simulation results of the waveforms of the actual d- and q-axis currents id and iq and those of the d- and q-axis command currents idr and iqr in the control system CS according to the first embodiment. In contrast, FIG. 4B schematically illustrates an example of the simulation results of the waveforms of the actual d- and q-axis currents id and iq and those of the d- and q-axis command currents idr and iqr in the control system CS whose evaluation function J does not include the output of the integral element 41.

Figure 4B:
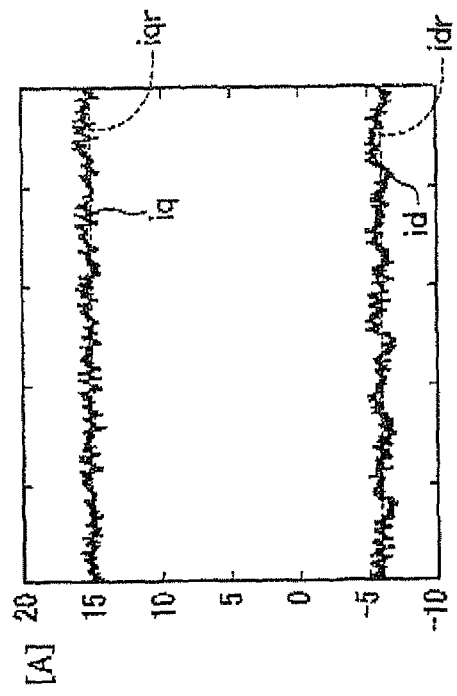
FIG. 4B is a graph schematically illustrating an example of simulation results of the waveforms of actual d- and q-axis currents and those of d- and q-axis command currents in the control system whose evaluation function does not include the output of an integral element.

As clearly seen by comparison between the waveforms of the actual d- and q-axis currents id and iq illustrated in FIG. 4A and those of the actual d- and q-axis currents id and iq illustrated in FIG. 4B, it is possible to reduce steady-state deviation between the actual d- and q-axis currents id and iq illustrated in FIG. 4A as compared with those between the actual d- and q-axis currents id and iq illustrated in FIG. 4B.

The control system CS according to the first embodiment is configured to calculate the predicted d- and q-axis current values ide and iqe using the actually measured d- and q-axis currents id and iq. For this reason, when there is steady-state deviation between each of the actually measured d- and q-axis currents id and iq and a corresponding one of the d- and q-axis command currents idr and iqr, the deviation between each of the predicted d- and q-axis current values ide and iqe and a corresponding one of the d- and q-axis command currents idr and iqr may reflect the steady-state deviation.

As described above, in order to address the steady-state deviation, the control system CS is configured to quantify the history of the changes in the deviation edq of the command current vector Idqr from the predicted current vector Idqe according to the output ξ of the integral element 41. This is equivalent to quantify the history of changes in the steady-state deviation between each of the actually measured d- and q-axis currents id and iq and a corresponding one of the d- and q-axis command currents idr and iqr.

The control system CS is also configured to add the quantified history of the changes in the deviation edq to the inner product edq$^2$, thus generating the evaluation function J. With this configuration, determination of one of the eight switching modes (eight voltage vectors V0 to V7) according to the evaluation function J reduces the steady-state deviation between each of the actual d-axis and q-axis currents id and iq and a corresponding one of the d- and q-axis command currents idr and iqr.

The control system CS is configured to predict the d- and q-axis command currents idr and iqr based on the equation model in the d-q coordinate system (rotating coordinate system).

For this reason, the control system CS is configured to quantify, as the history of changes in the steady-state deviation, the history of changes in the deviation edq of each of the d- and q-axis command currents idr and iqr from a corresponding one of the predicted d- and q-axis current values ide and iqe.

Thus, it is possible to reduce the load required to calculate the evaluation function J.

Second Embodiment

A control system CS1 according to the second embodiment of the present invention will be described hereinafter with reference to FIG. 5.

The structure of the control system according to the second embodiment is substantially identical to that of the control system CS according to the first embodiment except for the following different points. So, like parts and functional modules between the control systems according to the first and second embodiments, to which like reference characters are assigned, are omitted or simplified in description.

Referring to FIG. 5, the controller 20 includes a switching mode determiner 34A having a function that is slightly different from the function of the switching mode determiner 34 illustrated in FIG. 1. Specifically, the switching mode determiner 34A does not include the integral element 41 so that it does not add the square of the output ξ of the integral element 41 to the inner product edq$^2$ in order to generate the evaluation function J.

In addition, the controller 20 includes a first current corrector 35, a second current corrector 36, and the integral element 41, Like the first embodiment, the integral element 41 is operative to integrate a value of the deviation edq of the command current vector Idqr from the predicted current vector Idqe calculated for each of the previous prediction cycles and the present prediction cycle. The d-axis component ξd of the output ξ (ξd, ξq) of the integral element 41 is passed to the first current corrector 35, and the q-axis component ξq of the output ξ (ξd, ξq) of the integral element 41 is passed to the second current corrector 36.

The first current corrector 35 is operative to correct the d-axis component ide passed from the predictor 33 by, for example, subtracting the d-axis component ξd from the predicted d-axis current value ide, and to pass the corrected predicted d-axis current value ide to the switching mode determiner 34A.

Similarly, the second current corrector 36 is operative to correct the predicted q-axis current value iqe passed from the predictor 33 by, for example, subtracting the q-axis component ξq from the q-axis component iqe, and to pass the corrected q-axis component iqe to the switching mode determiner 34A.

The switching mode vector 34A sets, as the input of the evaluation function J, the corrected predicted d- and q-axis current values ide and iqe. This results in that the output of the evaluation function J according to the second embodiment is equivalent to that of the evaluation function J according to the first embodiment.

As described above, the control system CS1 according to the second embodiment is configured to quantify the history of the changes in the deviation edq of the command current vector Idqr from the predicted current vector Idqe. This results in quantifying the history of changes in the steady-state deviation between each of the actually measured d- and q-axis currents id and iq and a corresponding one of the d- and q-axis command currents idr and iqr.

The control system CS1 is also configured to correct the predicted d- and q-axis current values ide and iqe based on the quantified history of the changes in the deviation edq of the command current vector Idqr from the predicted current vector Idqe.

The control system CS1 is further configured to generate the evaluation function J according to the corrected predicted d- and q-axis current values ide and iqe of the predicted current vector idqe. With this configuration, like the first embodiment, determination of one of the eight switching modes (eight voltage vectors V0 to V7) according to the evaluation function J allows the steady-state deviation between each of the actual d-axis and q-axis currents id and iq and a corresponding one of the d- and q-axis command currents idr and iqr to be reduced.

Third Embodiment

A control system CS2 according to the third embodiment of the present invention will be described hereinafter with reference to FIG. 6.

The structure of the control system according to the third embodiment is substantially identical to that of the control system CS according to the first embodiment except for the following different points. So, like parts and functional modules between the control systems according to the first and third embodiments, to which like reference characters are assigned, are omitted or simplified in description.

Each of the control systems CS and CS1 according to the first and second embodiments is designed to determine, according to the predicted d- and q-axis current values (ide, iqe) and the d- and q-axis command currents (idr, iqr), one of the eight switching modes (eight voltage vectors V0 to V7) for driving the inverter IV. Specifically, driving of the inverter IV in the selected one of the eight switching modes (eight voltage vectors V0 to V7 regulates, to the request torque, the torque T to be created in the motor-generator 10, and/or regulates, to a value corresponding to the request torque, magnetic flux to be created thereby.

In contrast, the controller CS2 is designed to determine, according to a predicted value and a command value of each of the output torque of the motor-generator 10 and that of the magnetic flux to be created thereby, one of the eight switching modes (eight voltage vectors V0 to V7) for driving the inverter IV.

Figure 6:
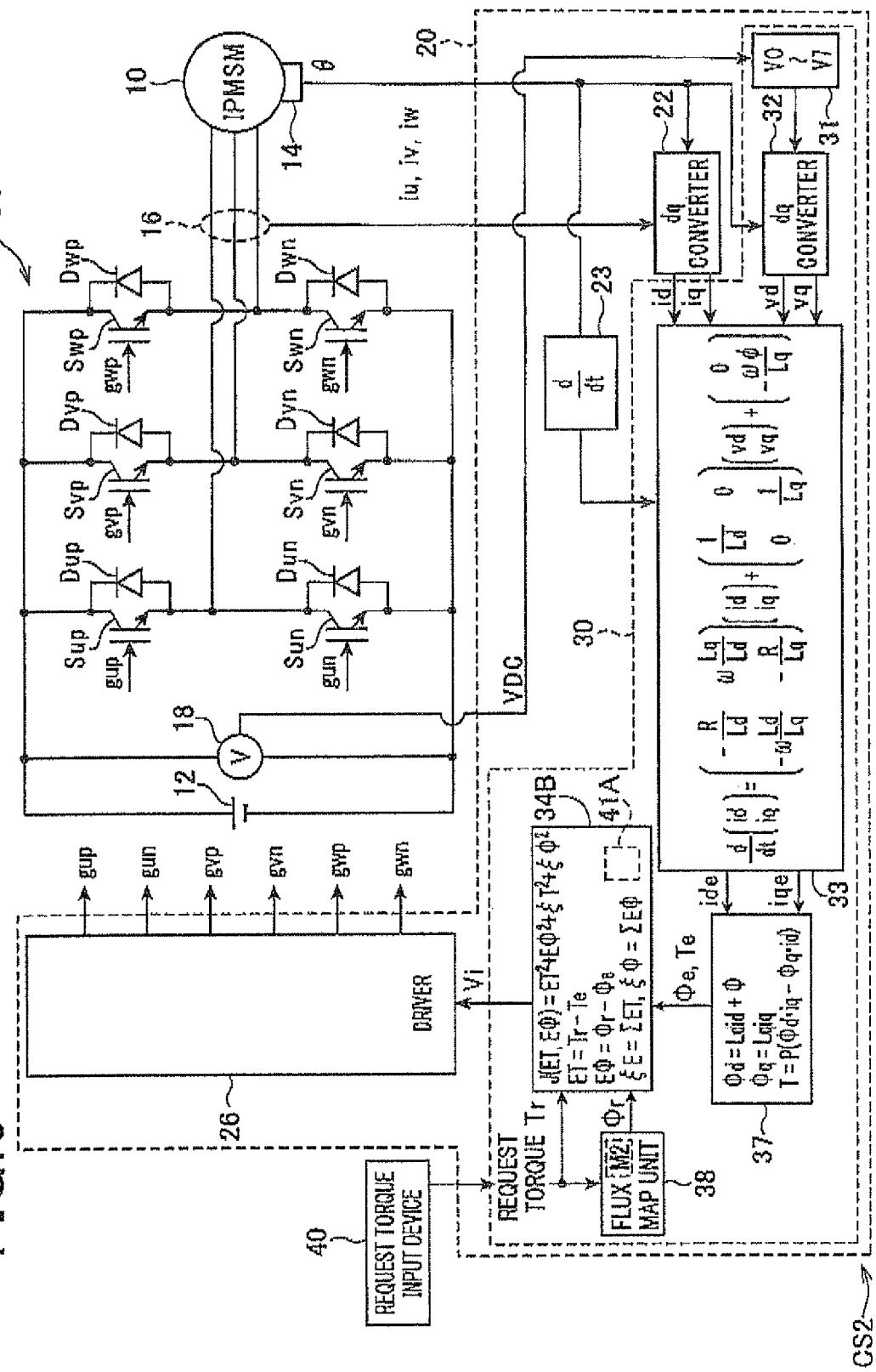
FIG. 6 is a circuit and block diagram of a control system according to the third embodiment of the present invention.

Referring to FIG. 6, the controller 20 includes a torque/flux predictor 37 and a flux map unit 38 in place of the command current setter 24.

The torque/flux predictor 37 is operative to predict, based on the predicted d- and q-axis current values ide and iqe, a flux vector Φe that should be generated in the d-q coordinate system. The predicted flux vector Φe in the d-q coordinate system consists of a predicted d-axis component Φd and a predicted q-axis component Φq.

In the third embodiment, the torque/flux predictor 37 is operative to predict, based on the predicted d- and q-axis current values ide and iqe, the predicted flux vector Φe (Φd, Φq) in accordance with the following equations [c5] and [c6]:

$$\Phi d = Ld \cdot id + \phi \quad [c5]$$

$$\Phi d = Lq \cdot iq \quad [c6]$$

In addition, the torque/flux predictor 37 is operative to predict, based on the predicted d- and q-axis current values ide and iqe, a torque Te that should be generated in the motor-generator 10 in accordance with the following equation [c7]:

$$Te = P(\Phi d \cdot iq - \Phi q \cdot id) \quad [c7]$$

where P represents the number of pole pair of the rotor.

The flux map unit 38 stores therein a map M2 comprised of, for example, a data table, an equation, or a program. The map M2 represents a function (relationship) between a variable of the request torque Tr and a variable of a request flux vector Φr. For example, in the third embodiment, the function represented by the map M2 is designed to provide one of various operations modes, such as maximum torque control mode that achieves maximum torque with a constant magnitude of the predicted current vector Idqe.

Based on the map M2, the flux map unit 38 sets the request flux vector Φr corresponding to the input value of the request torque Tr.

The controller 20 includes a switching mode determiner 34B having a function that is slightly different from the function of the switching mode determiner 34 illustrated in FIG. 1.

Specifically, the switching mode determiner 34B is operative to evaluate values of the evaluation function J of the respective eight switching modes, and select one of the eight switching modes, the evaluation of which is the highest in all of the eight switching modes.

In the third embodiment, the switching mode determiner 34 includes an integral element 41A to which the deviation EΦ of the request flux vector Φr from the predicted flux vector Φe(Φd, Φq) is inputted.

In addition, the deviation BT of the request torque Tr from the predicted torque Te is inputted to the integral element 41A.

Specifically, the switching mode determiner 34B is operative to quantify the history of changes in the deviation EΦ of the request flux vector Φr from the predicted flux vector Φe(Φd, Φq), and the history of the deviation ET of the request torque Tr from the predicted torque Te.

Then, the switching mode determiner 34B adds the inner product $ET^2$ and the inner product $E\Phi^2$ to the quantified history of changes in the deviation EΦ of the request flux vector Φr from the predicted flux vector Φe (Φd, Φq) and the quantified history of the deviation ET of the request torque Tr from the predicted torque Te, thus generating the evaluation function J.

The integral element 41A is operative to:

integrate (accumulate) a value of the deviation EΦ of the request flux vector Φr from the predicted flux vector Φe(Φd, Φq) calculated for each of the previous prediction cycles and the present prediction cycle to thereby output the integrated value as a ξE; and integrate a value of the deviation ET of the request torque Tr from the predicted torque Te calculated for each of the previous prediction cycles and the present prediction cycle to thereby output the integrated value as a ξT.

Specifically, the evaluation function J includes the output ξE of the integral part 41A that consists of the accumulation of the changes in the deviation EΦ of the request flux vector Φr from the predicted flux vector Φe(Φd, Φq) during the previous prediction cycles and the present prediction cycle. The evaluation function J also includes the output ξT of the integral part 41A that consists of the accumulation of the changes in the deviation ET of the request torque Tr from the predicted torque Te during the previous prediction cycles and the present prediction cycle.

For this reason, determination of one of the eight switching modes (eight voltage vectors) according to the evaluation function J reduces a steady-state deviation between an actual flux vector to be generated in the motor-generator 10 and the request flux vector Φr and that between an actual torque T to be generated in the motor-generator 10 and the request torque Tr.

Note that the switching mode determiner 34B does not add directly the outputs ξE and ξT of the integral part 41A but adds the square of each of the outputs ξE and ξT of the integral part 41A to the inner products $E\Phi^2$ and $ET^2$, thus generating the evaluation function J. This is because the evaluation function J has a characteristic that a value of the evaluation function J increases with decrease in evaluation, and each of the output ξE and the output ξT of the integral part 41A can take a positive or a negative value.

As described above, the control system CS2 according to the third embodiment is configured to quantify the history of the changes in the deviation EΦ of the request flux vector Φr from the predicted flux vector Φe(Φd, Φq), and the history of the deviation ET of the request torque Tr from the predicted torque Te. This results in quantifying the history of changes in the steady-state deviation between an actual flux vector to be generated in the motor-generator 10 and the request flux vector Φr and that between an actual torque T to be generated in the motor-generator 10 and the request torque Tr.

The control system CS2 is also configured to add the quantified history of the changes in the deviations EΦ and ET to the inner products E Φ$^2$ and ET$^2$, thus generating the evaluation function J. With this configuration, determination of one of the eight switching modes (eight voltage vectors V0 to V7) according to the evaluation function J reduces:

the steady-state deviation between the actual flux vector to be generated in the motor-generator 10 and the request flux vector Φr; and the steady-state deviation between the actual torque T to be generated in the motor-generator 10 and the request torque Tr.

Each of the first to third embodiments can be modified in the following manners.

In the second embodiment, the predicted d- and q-axis current values ide and iqe are corrected, but the d- and q-axis command currents idr and iqr can be corrected in the same manner as the predicted d- and q-axis current values ide and iqe.

In the second embodiment, the accumulation of the changes in the deviation edq of the command current vector Idqr from the predicted current vector Idqe calculated for each of the previous prediction cycles and the present prediction cycle is used to correct the predicted d- and q-axis current values ide and iqe, but the present invention is not limited thereto.

Specifically, the accumulation of the changes in the deviation edq of the command current vector Idqr from the predicted current vector Idqe calculated for each of the previous prediction cycles can be used to correct the predicted d- and q-axis current values ide and iqe. In other words, the accumulation of the changes in the deviation edq to be used to correct the predicted d- and q-axis current values ide and iqe cannot include the deviation edq of the command current vector Idqr from the predicted current vector Idqe during the present prediction cycle.

In the first embodiment, an addition of the square of the output ξ of the integral element 41 to the inner product edq$^2$ generates the evaluation function J, but an addition of the absolute value of the output ξ of the integral element 41 to the inner product edq$^2$ can generate the evaluation function J. Similarly, in the third embodiment, an addition of the square of each of the outputs ξΦ and ξT of the integral element 41 to the inner products EΦ$^2$ and ET$^2$ generates the evaluation function J, but an addition of the absolute value of each of the outputs ξΦ and ξT of the integral element 41 to the inner products EΦ$^2$ and ET$^2$ can generate the evaluation function J.

In each of the first and second embodiment, the history of changes in the deviation edq of the command current vector Idqr from the predicted current vector Idqe according to the output ξ (ξd, ξq) of the integral element 41 is quantified in the d-q coordinate system (rotating coordinate system), but the present invention is not limited thereto.

Specifically, the history of changes in the deviation edq of the command current vector Idqr from the predicted current vector Idqe according to the output ξ (ξd, ξq) of the integral element 41 can be quantified in the three-phase coordinate system. In this modification, the evaluation function is preferably designed based on the deviation of a three-phase command current vector from a predicted three-phase current vector. In place of the equation model of the motor-generator 10 in the d-q coordinate system, an equation model of the motor-generator 10 in the three-phase coordinate system can be used.

The changes applied to the control system CS2 according to the third embodiment relative to the control system CS according to the first embodiment can be applied to the control system CS1 according to the second embodiment.

In each of the first to third embodiments, a value of a controlled variable for each of the voltage vectors V0 to V7 is predicted, but the present invention is not limited thereto.

Specifically, a value of a controlled variable for each or some of the non-zero vectors V1 to V6 and any one of the zero vectors V0 and V7 can be predicted. It is preferable that a value of a controlled variable for each of a plurality of drive modes of the inverter IV is predicted.

As an integral element to which the deviation between a predicted value of a controlled variable and a command value for the controlled variable is inputted, the present invention is not limited to the integral element 41 that uses the accumulation of the changes in the deviation.

Specifically, an integral element that integrates, during the previous prediction cycles and the present prediction cycle, "+1" when the deviation of a command value for the controlled variable from a predicted value of the controlled variable is positive, "−1" when the deviation negative, or "0" when the deviation zero can be used. In addition, an integral element that integrates the product of a preset gain and a value of the deviation of a predicted value of the controlled variable from a predicted value of the controlled variable calculated for each of the previous prediction cycles and the present prediction cycle can be used; this preset gain is variable depending on a corresponding value of the deviation.

The evaluation function J is designed as the sum of the quantified deviation between a predicted value of a controlled variable and a command value for the controlled variable and the quantified history of changes in the deviation between a predicted value of a controlled variable and a command value for the controlled variable. However, the present invention is not limited to the structure. Specifically, the evaluation function J can be designed as the sum of:

the quantified deviation between a predicted value of a controlled variable and a command value for the controlled variable;

the quantified history of changes in the deviation between a predicted value of a controlled variable and a command value for the controlled variable; and the number of change in the switching modes.

The evaluation function J can also be designed as only the quantified history of changes in the deviation between a predicted value of a controlled variable and a command value for the controlled variable.

As a controlled variable to be used to determine one of the plurality of drive modes of the inverter IV, at least one of: drive current to be applied to the motor-generator 10; torque to be generated in the motor-generator 10; and magnetic flux to be generated therein can be used. In addition, as a controlled variable to be used to determine one of the plurality of drive modes of the inverter IV, a physical variable expressed as a function of the controlled variable can be used as the controlled variable.

In each of the first to third embodiments, the controller 20 determines one of the drive modes of the inverter IV at the next prediction cycle based on the deviation between a predicted value of the controlled variable associated with the next cycle and a command value of the controlled variable, but the present invention is not limited thereto.

Specifically, the controller 20 can determine one of the drive modes of the inverter IV at the next prediction cycle based on the history of changes of the deviation between a predicted value of the controlled variable and a command value of the controlled variable during N prediction cycles after the next prediction cycle (N is equal to or greater than 2). In this modification, the history of changes in the deviation between a predicted value of the controlled variable and a command value of the controlled variable used at the present prediction cycle is preferably quantified based on:

the history of changes in the deviation between a predicted value of the controlled variable and a command value of the controlled variable during the previous prediction cycles; and the deviation between a predicted value of the controlled variable and a command value of the controlled variable for each of the N prediction cycles.

However, the changes applied to the control system CS2 according to the third embodiment are applied to the control system CS1, the history of changes in the deviation between a predicted value of the controlled variable and a command value of the controlled variable used at the present prediction cycle can be quantified based on only:

the history of changes in the deviation between a predicted value of the controlled variable and a command value of the controlled variable during the previous prediction cycles.

The equation model can be discretized using the forward difference method as an example of difference methods, but it can be discretized using a linear M-step method (M is equal to or greater than 2), Runge Kutta method, or the like.

The equation model based on fundamental-wave drive, such as fundamental sinusoidal drive, is used to describe the motor-generator 10, but an equation model based on periodic-wave drive containing higher harmonic components can be used to describe the motor-generator 10. For example, an equation model in consideration of higher harmonic contents of inductance and those of induced voltage can be used to describe the motor-generator 10.

In each of the first to third embodiments, as a predicting unit to predict a value of a drive current to be applied to the motor-generator 10, a map can be used; this map means a storage unit that has stored therein values of at least one output parameter as the drive current corresponding to discrete values of at least one input parameter.

For example, as the at least one input parameter to the map, d- and q-axis voltages (vd, vq) or the electric angular velocity ω can be used.

In each of the first to third embodiments, a target controlled variable of the motor-generator 10, which is finally required to be set to a desired value, is a torque to be generated in the motor-generator 10, but the rotational speed of the motor-generator can be used as the target controlled variable of the motor-generator 10.

In each of the first to third embodiments, the equation model without considering the stator iron loss is used to predict a value of a controlled variable of the motor-generator 10, but an equation model considering the stator iron loss can be used to predict a value of a controlled variable of the motor-generator 10.

In each of the first to third embodiments, the actual rotational angle θ of the rotor is measured by the angular sensor 14, but it can be obtained according to the actual d- and q-axis currents.

In each of the first to third embodiments, as the motor-generator 10, an IPMSM is used, but another type of rotary machines, such as synchronous motors including a surface-magnet motor and a field-winding synchronous motor and induction motors including an induction motor can be used.

Various types of rotary machines according to the present invention can be installed in various types of vehicle, such as an electric automobile. Various types of rotary machines to which the present invention can be applied are not limited to a component of a drive system of vehicles.

The high-voltage battery 12 is used as a direct-current power source, but a capacitor that boosts up the battery voltage across the battery 12 can be used as the direct-current power source.

In each of the first to third embodiments, as a power converter having a switching element that selectively establishes electrical connection and electrical disconnection between a terminal of a rotary machine and a voltage application unit for applying a plurality of different voltage levels (for example, the positive level of the positive electrode of the battery 12 and the ground level of the negative electrode of the battery 12) to the terminal of the rotary machine through the power converter, the inverter IV is used, but the present invention is not limited thereto.

Specifically, a power converter having a switching element that selectively establishes electrical connection and electrical disconnection between a terminal of a rotary machine and a voltage application unit for applying three or more different voltage levels to the terminal of the rotary machine through the power converter can be used as the power converter according to the present invention. For example, such a power converter for applying, therethrough, three or more different voltage levels to the terminal of a rotary machine is disclosed in the Patent Application Publication No. 2006-174697.

While there has been described what is at present considered to be the embodiments and their modifications of the present invention, it will be understood that various modifications which are not described yet may be made therein, and it is intended to cover in the appended claims all such modifications as fall within the scope of the invention.

What is claimed is:

1. An apparatus For driving a switching element of a power converter so that the switching member selectively establishes electrical connection and electrical disconnection between a terminal of a rotary machine and a voltage application unit for applying a plurality of different voltage levels to the terminal of the rotary machine through the power converter to thereby control a controlled variable of the rotary machine, the apparatus comprising:

a predicting unit to use, as an initial value of the controlled variable, at least one of a first measured value of the controlled variable and a second measured value of a physical variable expressed as a function of the controlled variable and to predict, based on the initial value of the controlled variable, a value of the controlled variable when a driving mode of the switching element is set; and a driving unit having an integral element and configured to determine, based on an output of the integral element to which a deviation between the predicted value of the controlled variable and a command value of the controlled variable is inputted, an actual driving mode of the switching element to thereby drive the switching element in the determined driving mode.

2. The apparatus according to claim 1, wherein the controlled variable is a current to be applied to the rotary machine, the predicting unit is configured to predict the value of the controlled variable when the driving mode of the switching element is set in accordance with an equation model of the rotary machine in a rotating coordinate system of the rotary machine, and the driving unit is configured to quantify the deviation between the predicted value of the controlled variable and the command value of the controlled variable, and Input the quantified deviation to the integral element.

3. The apparatus according to claim 1, wherein the controlled variable is at least one of: a current to be applied to the rotary machine, a torque to be generated in the rotary machine, and a magnetic flux to be generated in the rotary machine.

4. The apparatus according to claim 1, wherein the voltage application unit includes a direct power source with a positive electrode and a negative electrode, and the switching element of the power converter selectively connects one of the positive electrode and the negative electrode with the terminal of the rotary machine.

5. The apparatus according to claim 1, wherein the driving mode of the switching element consists of a plurality of driving modes of the switching element, and the predicting unit is configured to:
  predict, based on the initial value of the controlled variable, the value of the controlled variable for each of the plurality of driving modes, and the driving unit is configured to:
  select, based on the output of the integral element to which the deviation between the predicted value of the controlled variable and the command value of the controlled variable is inputted for each of the plurality of driving modes, one of the plurality of driving modes as the actual driving mode of the switching element.

6. The apparatus according to claim 5, wherein the driving unit evaluates a value of an evaluation function for each of the plurality of driving modes, and selects one of the plurality of driving modes as the actual driving mode of the switching element according to the respective values of the evaluation function for the plurality of driving modes.

7. The apparatus according to claim 6, wherein the predicting unit is configured to cyclically predict the value of the controlled variable, and the driving unit is configured to:
  quantify a history of changes in the deviation between the predicted value of the controlled variable and the command value of the controlled variable during a present cycle and at least one previous cycle; and
  input the quantified history of changes in the deviation between the predicted value of the controlled variable and the command value of the controlled variable to the integral element, the evaluation function including the output of the integral element.

* * * * *